Feb. 3, 1959 L. M. PUSTER 2,872,118
THERMOSTATICALLY OPERATED VALVE
Filed Jan. 7, 1957
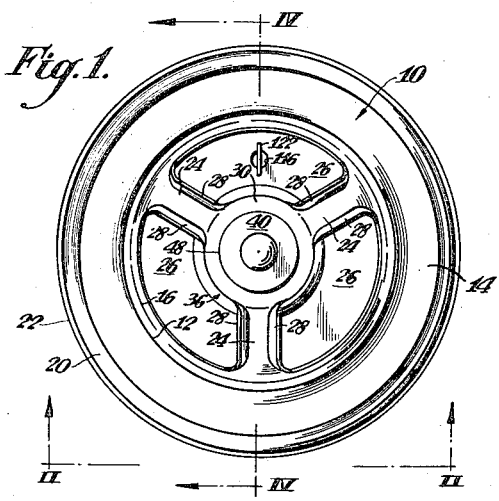
Fig. 1.
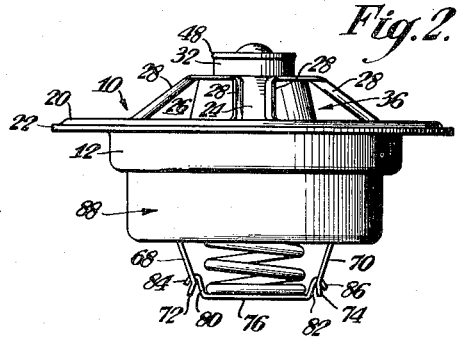
Fig. 2.
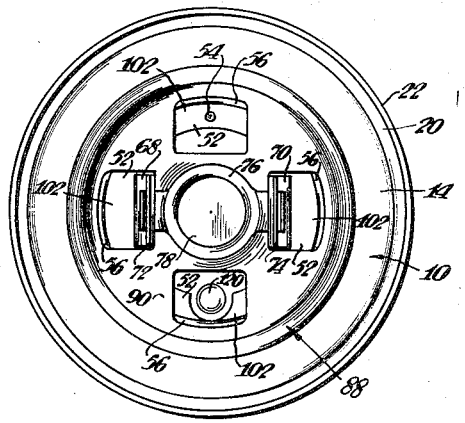
Fig. 3.
Fig. 4.
INVENTOR.
Louis M. Puster.
BY
HIS ATTORNEY.

United States Patent Office

2,872,118
Patented Feb. 3, 1959

2,872,118

THERMOSTATICALLY OPERATED VALVE

Louis M. Puster, Knoxville, Tenn., assignor to Robertshaw-Fulton Controls Company, Greensburg, Pa., a corporation of Delaware Application January 7, 1957, Serial No. 632,918

5 Claims. (Cl. 236—34)

This invention relates to a pressure insensitive thermostatically operated valve and more particularly to a balanced-type, choker sleeve valve that is used to control the flow of fluid in a conduit or the like in response to temperature variations of the fluid therein.

One object of the invention is to prevent the leakage of fluid past a valve member.

Another object of the invention is to insure a fluid pressure balance across a valve member in all of the controlling positions thereof.

Another object of the invention is to prevent the entrapment of air in the fluid on the upstream side of a valve.

Another object of the invention is to simplify the construction and arrangement of parts in a sleeve-type valve.

In conformity with these objects, the preferred embodiment of the invention is characterized by a sleeve-type valve member which is slidably mounted on a guide means, a seal retainer and a seal and which is moved between a plurality of controlling positions relative to a valve seat formed on a support member by a spring-biased, pressure insensitive thermostat. A check valve is carried by the guide means to prevent the entrapment of air in the fluid on the upstream side of the valve member, and the guide means also supports a seal retainer. The seal is retained in a position to prevent the leakage of fluid past the valve member in all of the positions thereof, and the valve member is so constructed and supported as to operate under a balanced fluid pressure condition.

These and other objects of the present invention will become apparent from the following description taken in connection with the accompanying drawing wherein:

Fig. 1 is a top plan view of the valve;

Fig. 2 is a side elevation view of Fig. 1 in the direction of the arrows II—II;

Fig. 3 is a bottom plan view of the valve; and

Fig. 4 is a section taken along the line IV—IV of Fig. 1 with some of the components of the valve shown in elevation and with the valve installed in a position of intended use.

Referring more particularly to the drawing, the valve includes a flanged support member or spider, generally designated by the reference numeral 10, comprising an annulus 12 having an integral, substantially right-angular flange 14 extending therefrom at one end thereof and provided with an integral, upwardly converging annular flange 16 extending from the opposite end thereof. Flange 14 is annularly recessed at 18 (Fig. 4) to provide an annular bead 20 thereon adjacent the periphery 22 thereof.

A plurality of equally spaced arms 24, in this instance three, are integrally formed with converging flange 16 and extend upwardly and inwardly of annulus 12 to define three equally spaced ports 26 (Fig. 1) in the support member 10. The edges of each arm 24 are angularly bent toward each other to provide a pair of opposed flanges 28-28 thereon. Flanges 28-28 extend substantially the entire length of arms 24 and considerably increase the strength and rigidity thereof. Arms 24 terminate at their inner extremities in an annular hub 30 that includes a cylindrical portion 32 which extends axially of support member 10 and defines a centrally located bore 34 therein.

A hollow, irregular shaped sleeve member 36 is carried by the support member 10 and extends substantially axially thereof. The sleeve member 36 is provided with a chamber 38 extending from the larger end thereof and is sealed at the smaller end by an end wall 40 having a centrally located recess 42 therein (Fig. 4). Adjacent the smaller end, the sleeve member 36 is provided with an annular shoulder 44 thereon which intersects an annular side wall portion 46 that terminates in an annular bead 48.

In assembly, as best shown in Fig. 4, the sleeve member side wall portion 46 is adapted to be received and rigidly retained within the bore 34 of support member 10. Bead 48, in combination with the registry of hub 30 and shoulder 44 and the registry of cylindrical portion 32 and side wall portion 46, provides a rigid mechanical interlock between the support member 10 and the sleeve member 36 and thereby prevents any relative axial movement therebetween.

At the larger end thereof, sleeve member 36 terminates in a substantially right-annular guide flange 50. An annular seal retainer 52 (Figs. 3 and 4) is attached to guide flange 50 by any suitable means, such as rivets 54 (only one shown), and is concentrically reduced adjacent its outer edge to provide an annular wall 56 and a short annular flange 58 thereon. Wall 56 and flange 58 in combination with the guide flange 50 form an annular recess 60 separating the outer peripheries 62 and 64 of the flange 58 and the guide flange 50, respectively. The annular recess 60 thus defined is adapted to receive therein a resilient seal 66, the purpose of the seal to be discussed more in detail hereinafter.

Seal retainer 52 also carries a pair of diametrically opposed, resilient arms 68 and 70 which converge inwardly and extend substantially longitudinally of support member 10. As best shown in Fig. 3, the arms 68 and 70 are preferably formed integrally with seal retainer 52 but may be separately fabricated and attached to seal retainer 52 by suitable means, such as welding or brazing. Arms 68 and 70 are provided with a pair of opposed apertures therein (not shown) and terminate in obliquely out-turned extremities 72 and 74, respectively.

An annular abutment or spring seat 76, centrally ported at 78 and provided with a pair of integral, diametrically opposed arms 80 and 82 thereon, is carried by seal retainer arms 68 and 70 in the pair of opposed apertures therein. Spring seat arms 80 and 82 are provided with hooked ends 84 and 86, respectively, and the hooked ends 84 and 86 are anchored on the obliquely out-turned extremities 72 and 74, respectively, of the seal retainer arms 68 and 70, respectively. It will be noted that the angular configuration of hooked ends 84 and 86 is substantially identical to the angular configuration of the out-turned extremities 72 and 74 on the arms 68 and 70, respectively, to thereby insure a firm seating engagement between the hooked ends 84 and 86 and the out-turned extremities 72 and 74.

A hollow sleeve-type valve member, generally designated by the reference numeral 88, surrounds guide flange 50 and the parts carried thereby and is adapted to be moved between a plurality of controlling positions relative to support member flange 16. Valve member 88 is "open" at one end thereof (viewing Fig. 4) and at the opposite end thereof is provided with an inwardly converging end wall 90. Converging wall 90 intersects an axially extending cylindrical wall portion 92 which terminates in annular radially extending wall portion 94. It will be noted that the wall portion 94 defines a relatively large aperture 96 located centrally of the valve member 88.

The "open" end of valve member 88 is provided with a beveled end wall surface 98 thereon which is substantially identical in angular configuration to the angular configuration of support member flange 16. The beveled end wall surface 98 is adapted to seat on the flange 16 in one of the controlling positions of the valve member 88, the flange 16 thereby functioning as a valve seat. The beveled end wall surface 98 insures a substantially leakproof connection between the valve member 88 and the valve seat flange 16.

The end wall of the valve member 88 is also reversely beveled at 100, and the converging end wall 90 thereof, as best shown in Fig. 3, is provided with a plurality, in this instance four, of equally spaced ports 102 therein. It will be noted that the seal retainer arms 68 and 70 extend through a pair of the ports 102.

A pressure insensitive, wax-fusion type thermostat or thermally responsive means (Fig. 4), generally designated by the reference numeral 104, is positioned between the valve member 88 and the end wall 40 of sleeve member 36. The thermostat 104 includes a casing or housing 106, a clamping and sealing band 108, a hollow, generally cylindrical member 110, and an extensible and retractable piston 112 which is slidably received in the inner bore (not shown) of the member 110. The casing 106 is filled with a wax-like substance which changes from a solid to a liquid at a predetermined temperature and the change in volume thereof produces movement of a diaphragm (not shown) located in the band 108 which in turn imparts movement to the extensible and retractable piston 112.

Thermostat 104 is a pressure insensitive-type thermostat since it is insensitive to static or system pressures in a fluid in which it may operate or may be submerged, such as the static or system pressures in the cooling system of an internal combustion engine. These static or system pressures when applied to the thermostat extensible and retractable piston 112 will be transmitted to the diaphragm and wax-like substance within the thermostat 104, but the wax-like substance is for all practical purposes incompressible. In view of this incompressibility, the movement of the thermostat piston 112, therefore, is not affected by static or system pressures or by any change in external loading. Inasmuch as thermostats of this type are well known in the art, further discussion of the structure and function of the thermostat per se is deemed unnecessary.

In assembly, the band 108 of the thermostat 104 is seated on valve member wall portion 94 whereby the casing 106 thereof is received in the valve member aperture 96 and the extensible and retractable piston 112 thereof is seated in the recess 42 in sleeve member end wall 40. When piston 112 extends in response to an increase in volume of the wax-like substance in casing 106, the other components of the thermostat 104 are displaced axially relative thereto and the valve member 88 is thereby moved in a direction away from the valve seat flange 16.

The movement of the valve member 88 by the thermostat 104 is opposed by the thrust of the compression spring 114. The compression spring 114 has one end thereof seated on the spring seat 76 and the opposite end thereof seated on the valve member wall portion 94. It will be noted that the compression spring 114 constantly urges the valve member 88 toward engagement with the valve seat flange 16.

Guide flange 50 is also provided with an aperture 116 therein which slidably receives a check valve in the form of a "jiggle pin" 118 (Fig. 4). "Jiggle pin" 118 is provided with an annular head 120 on one end thereof and is retained in aperture 116 by a flattened portion 122 on the opposite end thereof.

*Operation*

Referring to Fig. 4, the subject valve is shown installed between the mating ends of a pair of conduits, such as a fluid coolant conduit 124 in the head 126 (shown cut-away) of an internal combustion engine and a conduit 128 in a fluid manifold 130 (shown cut-away). The annulus 12 of support member 10 is adapted to snugly fit within the inner periphery of head conduit 124, and the bead 20 on support member flange 14 is adapted to register with an annular recess 132 formed in a flange 134 on the manifold 130. A pair of bolts 136 rigidly anchor the fluid manifold 130 to the engine head 126 and a gasket 138 is positioned between the manifold flange 134 and the engine head 126 to prevent possible fluid leakage.

With the valve so positioned, it will be noted that the casing 106 of the thermostat 104 projects downwardly into the coolant conduit 124 where it is always exposed to the maximum velocity of fluid flow therein. This structural arrangement enables the wax-like substance in casing 106 to instantaneously and accurately reflect the variations in temperature of the fluid passing through conduit 124.

It will also be noted that the compression springs 114 has moved the valve member 88 to the "closed" position. In this position of the valve member 88, the passage of fluid between the conduits 124 and 128 will be prevented by the engagement of the valve member beveled end wall surface 98 with valve seat 16 and also by the engagement of the seal 66 with the inner periphery of the valve member 88.

If the temperature of the fluid in conduit 124 should increase sufficiently to produce an extension of thermostat piston 112, the other components of the thermostat 104 will be moved downwardly to thereby unseat the valve member 88. The fluid in conduit 124 will then flow over the valve member beveled end wall surface 98 and will pass through the plurality of ports 26 in support member 10 into manifold conduit 128.

If the temperature of the fluid in conduit 124 should decrease after the valve member 88 has been moved to the "open" position, the piston 112 of thermostat 104 will be retracted by the thrust of compression spring 114 and the valve member will be moved back into engagement with the valve seat 16.

As shown in Fig. 4, the head 120 of the "jiggle pin" 118 has been moved into engagement with guide flange 50 by the fluid pressure within conduit 124 to thereby obstruct the passage of coolant fluid in aperture 116. When the valve member 88 is in the "closed" position and the coolant fluid in conduit 124 is supplied under pressure by the coolant pump (not shown) of the internal combustion engine, the head 120 of "jiggle pin" 118 will remain in engagement with guide flange 50 because of the pressure difference across the "jiggle pin" 118. However, when the valve member 88 is in the "closed" position and the coolant in conduit 124 is not supplied under pressure, i. e., when the coolant pump is not in operation, the "jiggle pin" 118 will gravitate downwardly and uncover aperture 116. Any air that is trapped in the coolant fluid on the upstream side of the valve (in conduit 124) will then be vented through aperture 116 and pass into the coolant fluid on the downstream side of the valve (in conduit 128).

In moving between the "open" and "closed" positions, it will be noted that the valve member 88 is guided and stabilized by the peripheral surfaces 62 and 64 of the seal retainer flange 58 and guide flange 50, respectively, in combination with the seal 66. In addition to stabilizing the movement of the valve member 88, seal 66 also snugly engages the inner periphery of the valve member 88 and thereby prevents the leakage of fluid past the valve in all of the controlling positions of the valve member 88.

It will also be noted that the sleeve valve member 88, in all of the controlling positions thereof, is pressure balanced or insensitive to variations in fluid pressure, i. e., variations in fluid pressure in conduit 124 will not produce any axial movement of the valve member 88. Ports 102 eliminate any unbalanced pressure areas on the valve member 88 below seal 66 and seal retainer flange 58, and the fluid pressure forces which would otherwise tend to produce axial movement of the valve member 88 are absorbed by the guide flange 50, the seal retainer 52 and the inner surface of chamber 38 of sleeve member 36. Similarly, the fluid pressure forces in conduit 124 which act on the valve member 88 above seal 66 and guide flange 50 will be applied radially to the valve member 88 and will obviously produce no axial movement thereof. This pressure balance or pressure insensitivity of the valve member 88 is especially important since it prevents the transmittal of axial forces to the thermostat 104 in the event of pressure drops across the valve member 88 whereby the thermostat 104 will control the movement of the valve member 88 only in response to variations in fluid temperature.

While the present invention has been herein shown and described in connection with the cooling system of an internal combustion engine, it will be understood that the invention is not to be limited to the particular environmental application. Quite obviously, a thermostatically operated valve constructed in accordance with the present invention can be advantageously utilized in any environmental application wherein it is desirable to use a balanced choker-type sleeve valve which is provided with a valve member controlled by a thermostat and resilient means and guided by a pair of flanges and a seal to move between a plurality of controlling positions relative to a valve seat formed on a support member.

Furthermore, while only one embodiment of the invention has been herein shown and described, it will be apparent to those skilled in the art that the construction and arrangement of parts may be variously embodied or changed without departing from the scope of the invention as defined in the appended claims.

It is claimed and desired to secure by Letters Patent:

1. A flow control valve comprising an apertured support member, a valve seat on said support member, a hollow sleeve member having a closed end carried by said support member and an opposite open end provided with guide means, a hollow valve member cooperable with said guide means and movable between a plurality of controlling positions relative to said valve seat, means on said guide means defining a recess, sealing means carried in said recess and being engageable with said valve member, abutment means operatively connected to said sleeve member, thermally responsive means carried centrally of said valve member and having an extensible and retractable portion thereof engageable with the closed end of said sleeve member for producing movement of said valve member, and resilient means cooperable with said abutment means and said valve member for opposing the movement of said valve member by said thermally responsive means.

2. A balanced, pressure insensitive control valve comprising a flanged support member having a valve seat thereon and provided with a plurality of fluid ports therein, a sleeve member centrally carried on said support member and provided with a guide flange extending therefrom, means on said guide flange defining a recess, a seal seated in said recess, a hollow valve member movable between a plurality of controlling positions relative to said valve seat and being cooperable with said guide flange and said seal, said valve member provided with a plurality of apertures therein, pressure insensitive thermally responsive means operably associated with said valve member and said sleeve member for imparting movement to said valve member, and resilient means cooperable with said valve member for opposing the movement of said valve member by said thermally responsive means, said apertures in said valve member in combination with said seal and said guide flange being operable to insure a fluid pressure balance across said valve member in all of the controlling positions thereof.

3. In a valve for controlling the flow of fluid, the combination comprising an apertured support member, a valve seat on said support member, a sleeve valve member movable between a plurality of controlling positions relative to said valve seat, said valve member having a plurality of fluid ports therein, a hollow sleeve member carried by said support member centrally thereof and provided with an annular flange thereon, means affixed to said sleeve member flange defining an annular recess, a pair of arms carried by said last named means and extending through said ports in said valve member, a resilient seal seated in said annular recess and sealingly engaging said valve member, a seat carried by said pair of arms, thermally responsive means carried by said valve member and having an extensible and retractable portion thereof engageable with said sleeve member for producing movement of said valve member, and resilient means positioned between said seat and said valve member for opposing the movement of said valve member by said thermally responsive means, said ports in said valve member, said seal, and said sleeve member flange and said means affixed thereto being operable to insure a fluid pressure balance across said valve member in all of the controlling positions thereof.

4. In a temperature responsive valve for controlling the flow of fluid in a conduit or the like, the combination comprising a flanged support member having a plurality of ports therein, a valve seat on said flanged support member, a hollow sleeve member carried by the central portion of said flanged support member and extending axially thereof, said sleeve member closed at one end thereof and terminating in an annular guide flange at the opposite end thereof, pressure relief means carried by said guide flange, a hollow valve member provided with a centrally located port therein and being cooperable with said guide flange for movement between a plurality of controlling positions relative to said valve seat, pressure insensitive thermally responsive means operably associated with said valve member for producing movement thereof, said thermally responsive means having a portion projecting through said port in said valve member and having an extensible and retractable portion engageable with the closed end of said sleeve member, an abutment member operatively connected to said guide flange and spaced therefrom, and resilient means having one end thereof seated on said abutment member and the opposite end thereof seated centrally of said valve member for opposing the movement of said valve member by said thermally responsive means.

5. In a balanced pressure insensitive valve for controlling the flow of fluid in a conduit or the like, the combination comprising a support member having a plurality of fluid ports therein, a valve seat on said support member, a hollow sleeve member closed at one end thereof and terminating in a flange at the other end thereof carried centrally of said support member, check valve means carried by said sleeve member flange, a concentrically reduced member affixed to said sleeve member flange and defining an annular recess at the outer periphery of said sleeve member flange, a sleeve valve member guided by the outer peripheries of said sleeve member flange and said concentrically reduced annular member and movable between a plurality of controlling positions relative to said valve seat, said valve member provided with a centrally located aperture and a plurality of fluid ports therein, a seal carried in said annular recess for sealing engagement with said valve member, a pair of arms carried by said concentrically reduced member and extending through said fluid ports in said valve member, a seat carried by said pair of arms, pressure insensitive thermally responsive means operatively connected to said valve member and said sleeve member for producing movement of said valve member, said thermally responsive means provided with a portion extending through the centrally located aperture in said valve member and provided with an extensible and retractable portion engageable with the closed end of said sleeve member, and resilient means having one end thereof seated on said seat and the opposite end thereof seated on said valve member for opposing the movement of said valve member by said thermally responsive means, said fluid ports in said valve member in combination with said seal and said sleeve member flange being operable to insure a fluid pressure balance across said valve member in all of the controlling positions thereof.

References Cited in the file of this patent

UNITED STATES PATENTS

| | | |
|---|---|---|
| 1,639,286 | Carson | Aug. 16, 1927 |
| 2,356,958 | Von Wangenheim | Aug. 29, 1944 |
| 2,469,930 | Payne | May 10, 1949 |